United States Patent [19]

Böhm et al.

[11] Patent Number: 5,019,127
[45] Date of Patent: May 28, 1991

[54] DOSING A LIQUID

[75] Inventors: Jürgen Böhm, Kaarst; Georg Fischer, Velbert, both of Fed. Rep. of Germany

[73] Assignee: Benz & Hilgers GmbH, Dusseldorf, Fed. Rep. of Germany

[21] Appl. No.: 528,127

[22] Filed: May 23, 1990

[30] Foreign Application Priority Data

Jun. 19, 1989 [DE] Fed. Rep. of Germany ....... 3919913

[51] Int. Cl.$^5$ ............................................. G01F 11/00
[52] U.S. Cl. ...................................... 222/1; 222/309; 222/380; 141/258
[58] Field of Search .................. 222/1, 380, 309, 452, 222/255; 141/258, 259, 260, 261

[56] References Cited

U.S. PATENT DOCUMENTS

| 3,168,225 | 2/1965 | Miller et al. | 222/380 O |
| 3,833,155 | 9/1974 | Farfaglia | 222/275 O |
| 3,850,345 | 11/1974 | Merritt | 222/168.5 O |
| 3,865,281 | 2/1975 | Byrd et al. | 222/309 X |
| 4,076,482 | 2/1978 | Whetstone | 222/255 X |
| 4,178,929 | 12/1979 | Voegele | 222/380 X |
| 4,399,932 | 8/1983 | Zimmermann | 222/380 O |
| 4,437,498 | 3/1984 | Pankratz et al. | 222/380 X |
| 4,708,269 | 11/1987 | Willerding | 222/309 X |
| 4,842,026 | 6/1989 | Nordmeyer et al. | 141/258 X |
| 4,860,926 | 8/1989 | Juenkersfeld et al. | 141/258 X |

FOREIGN PATENT DOCUMENTS 2900851 9/1984 Fed. Rep. of Germany .
1278869 1/1961 France ............................... 222/380

Primary Examiner—Michael S. Huppert
Assistant Examiner—Anthoula Pomrening
Attorney, Agent, or Firm—Herbert Dubno; Andrew Wilford

[57] ABSTRACT

A liquid is dosed by an apparatus that has a housing formed with an inlet connected to a supply of the liquid, an outlet, a filling chamber, and a bypass chamber having an outlet side from which the outlet opens and an inlet side connected to the inlet. A pumping piston subdivides the filling chamber into an inlet compartment into which the inlet opens and an outlet compartment. A valve element in the housing can move between a filling position blocking the outlet and connecting the inlet through the bypass chamber with the outlet compartment and a feed position exposing the outlet and blocking flow between the inlet and the outlet compartment through the bypass chamber. The piston is alternately retracted through a back stroke while the element is in the filling position to draw liquid into the outlet compartment from the inlet through the bypass chamber and is advanced through a predetermined advance stroke while the element is in the feed position to eject the drawn-in liquid from the outlet. At least periodically the length of the back stroke is changed while maintaining the advance stroke always of the same length so that the end positions of the piston move and the inlet compartment is flushed.

6 Claims, 4 Drawing Sheets

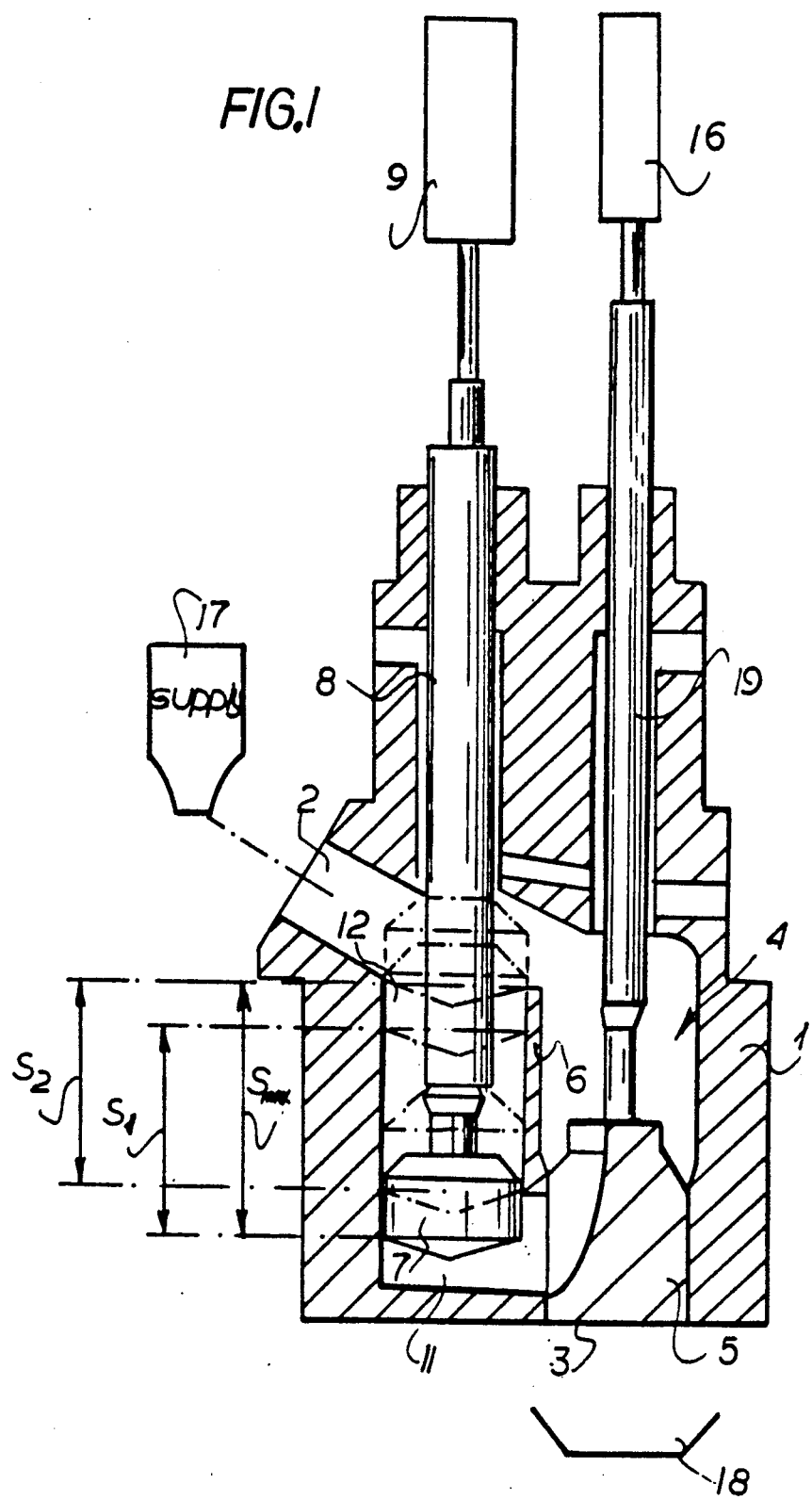

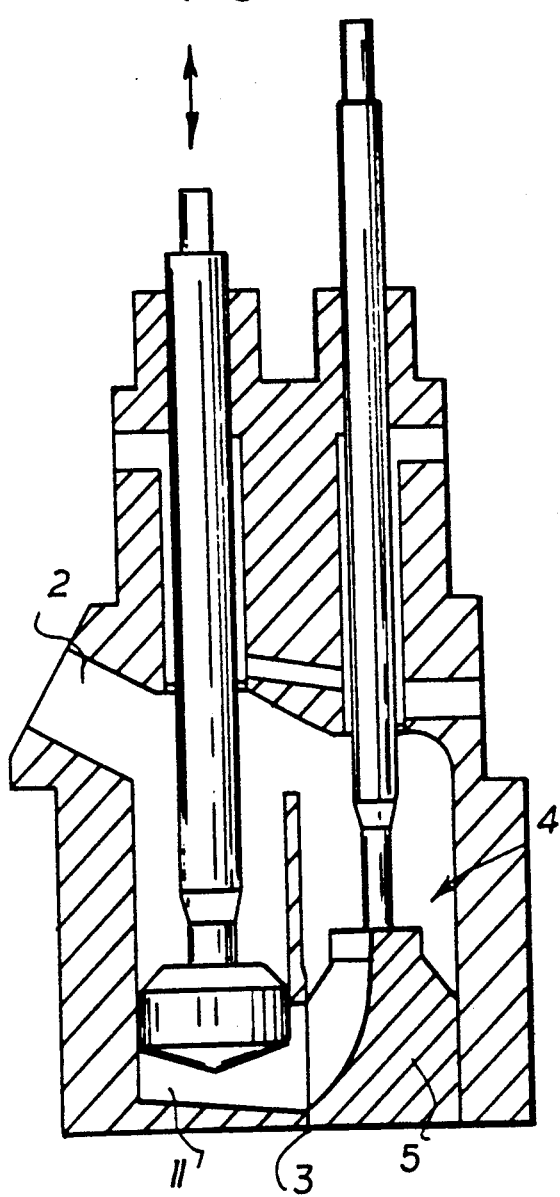
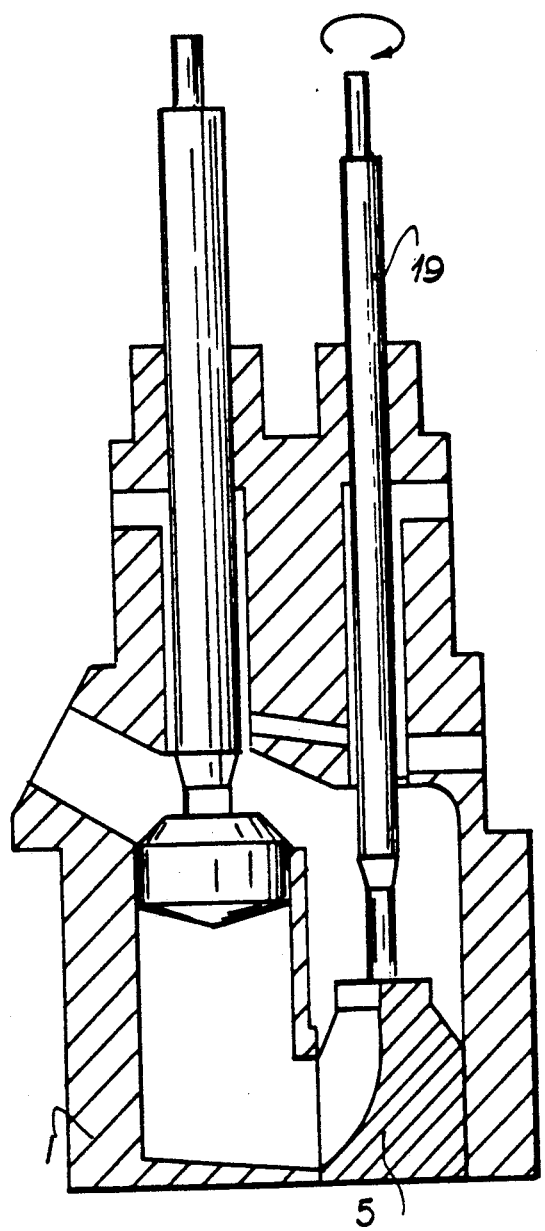

FIG.4
FIG.5
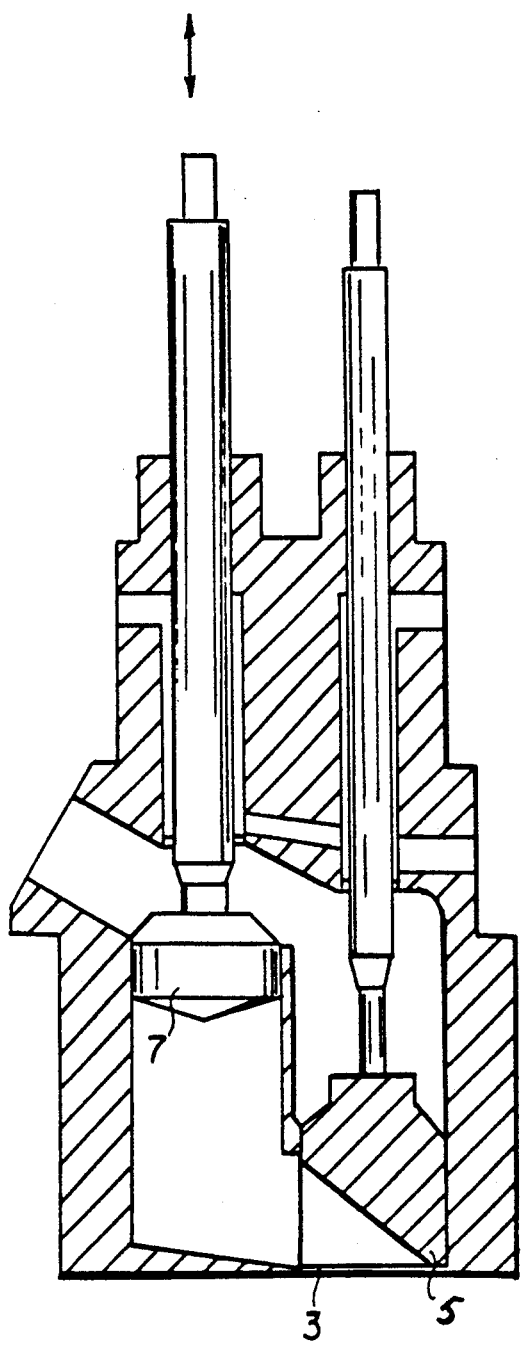
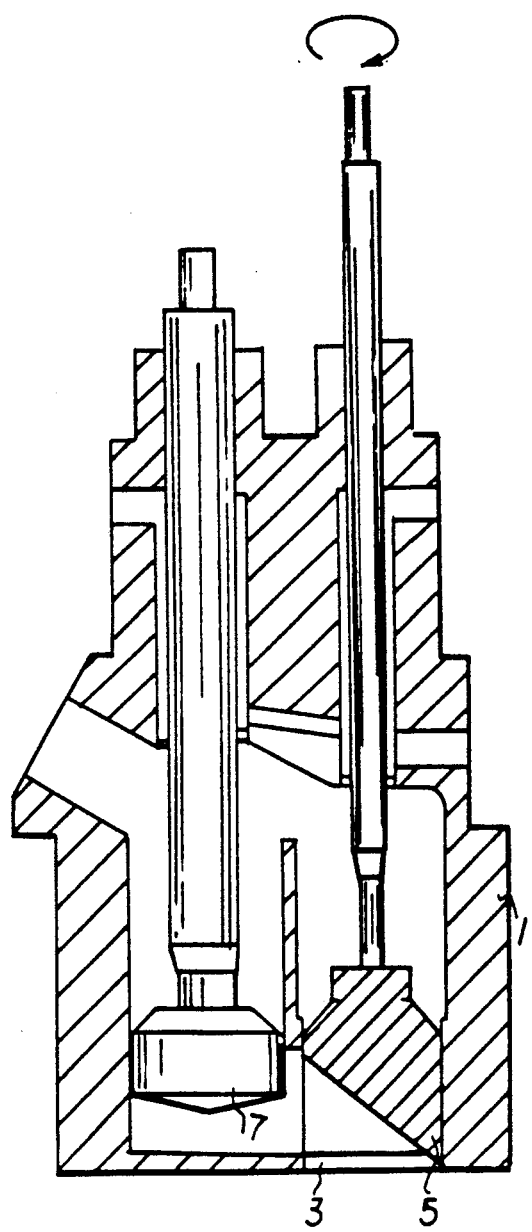

DOSING A LIQUID

FIELD OF THE INVENTION

The present invention relates to the dosing of a liquid. More particularly this invention concerns a method of and apparatus for portioning a liquid, in particular a viscous liquid foodstuff, in doses.

BACKGROUND OF THE INVENTION

As described in German patent 2,900,851 filed 11 Jan. 1979 by H. G. Volz et al a standard apparatus for dosing a liquid has a housing formed with an inlet connected to a supply of the liquid, an outlet, a filling chamber, and a bypass chamber having an outlet side from which the outlet opens and an inlet side connected to the inlet. A pumping piston subdivides the filling chamber into an inlet compartment into which the inlet opens and an outlet compartment. A valve element in the housing can move between a filling position blocking the outlet and connecting the inlet through the bypass chamber with the outlet compartment and a feed position exposing the outlet and blocking flow between the inlet and the outlet compartment through the bypass compartment.

Such a dosing apparatus is operated by alternately retracting the piston through a back stroke while the valve element is in the filling position to draw the liquid into the outlet compartment from the inlet through the bypass compartment and advancing the piston through a predetermined advance stroke while the valve element is in the feed position to eject the drawn-in liquid from the outlet. In this manner it is possible to control the dose size very accurately.

A major disadvantage of such a system is that pockets of little or no flow are formed in the housing. In particular the inlet compartment often is quite stagnant so that, although the flow through the housing is considerable, the material in this inlet compartment can be quite stale. When the system is used, as is common, with a foodstuff, this stale material can contaminate the fresh material being pumped with bacteria. It is also possible for the rear end of the outlet compartment to constitute a dead pocket holding stale material.

OBJECTS OF THE INVENTION

It is therefore an object of the present invention to provide an improved method of and apparatus for dosing a liquid.

Another object is the provision of such an improved method of and apparatus for dosing a liquid which overcomes the above-given disadvantages, that is which ensures relatively complete flushing of the pump housing during the normal course of operation of the device.

SUMMARY OF THE INVENTION

According to this invention an apparatus for dosing a liquid has, as is known, a housing formed with an inlet connected to a supply of the liquid, an outlet, a filling chamber, and a bypass chamber having an outlet side from which the outlet opens and an inlet side connected to the inlet. A pumping piston subdivides the filling chamber into an inlet compartment into which the inlet opens and an outlet compartment. A valve element in the housing can move between a filling position blocking the outlet and connecting the inlet through the bypass chamber with the outlet compartment and a feed position exposing the outlet and blocking flow between the inlet and the outlet compartment through the bypass compartment. The piston is alternately retracted through a back stroke while the element is in the filling position to draw liquid into the outlet compartment from the inlet through the bypass compartment and is advanced through a predetermined advance stroke while the element is in the feed position to eject the drawn-in liquid from the outlet. In accordance with this invention at least periodically the length of the back stroke is changed while maintaining the advance stroke always of the same length s that the end positions of the piston move and the inlet compartment is flushed.

In the standard arrangement the maximum possible stroke of the filling piston, that is its travel while still in contact with its cylinder walls and subdividing the inlet and outlet compartments, is much longer than the normally used stroke. In the extreme rear end position and the extreme front end positions the respective inlet and outlet compartments would be flushed, but since the piston does not normally move between these positions there is a dead spot on its front or back side. If its stroke were between the rear end position and an intermediate position, the inlet compartment would be flushed, but a dead spot would lie on the front face of the piston in the inlet compartment and vice versa if the piston's stroke were between the front end position and an intermediate position. With the system of this invention, however, the piston's stroke is moved about so that at some times it is actually delimited by the rear end position, thereby flushing the inlet compartment, and at some times at the front end position, thereby flushing the outlet compartment.

According to this invention the length of the back stroke is changed at regular intervals. It is also possible for it to be varied in steps, or even continuously and steplessly.

The apparatus of this invention has control means connected to actuators of the pump piston and valve element for moving the piston back and forth and for at least periodically changing the length of the back stroke while maintaining the advance stroke always of the same length. The actuators can be hydraulic cylinders, electric time-controlled motors, or the like.

DESCRIPTION OF THE DRAWINGS

The above and other objects, features, and advantages will become more readily apparent from the following, reference being made to the accompanying drawing in which:

FIG. 1 is a partly diagrammatic vertical section through the system of this invention;

FIGS. 2 and 3 are views like FIG. 1 showing the device at the beginning and end of its back stroke, respectively;

FIGS. 4 and 5 are views like FIGS. 2 and 3 but showing the device at the rear and front ends of its forward stroke.

SPECIFIC DESCRIPTION

Figure 6:
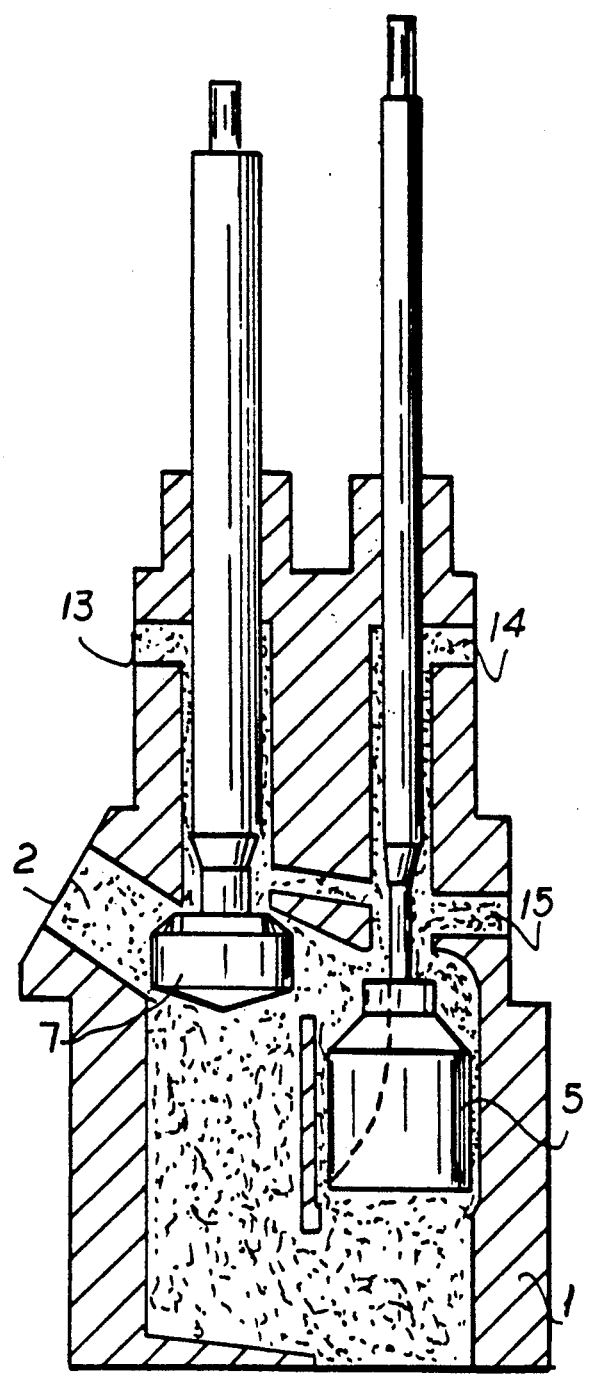
FIG. 6 shows the apparatus in the cleaning position.

As seen in FIG. 1 a dosing apparatus according to this invention has a housing 1 formed with an inlet 2 connected to a supply 17 of a viscous liquid foodstuff and an outlet 3 that delivers measured doses of the foodstuff to containers 18. Internally the housing 1 is formed with a bypass chamber 4 and a dosing or filling chamber or cylinder 6. A valve element 5 carried on a shaft 19 connected to an actuator 16 can move between a position (FIGS. 1, 2, and 3) blocking the outlet 3 and a position (FIGS. 4 and 5) unblocking this outlet 3. A dosing piston 7 carried on a rod 8 connected to an actuator 9 subdivides the filling cylinder 6 into a front or outlet compartment 11 and a rear or inlet compartment 12. The rear compartment 12 is always open, like the rear end of the bypass chamber 4, to the inlet 2. The front compartment 11 can be connected by the valve element 5 (FIGS. 1, 2, and 3) through the bypass compartment 4 to the inlet 2 or (FIGS. 4 and 5) to the outlet 3 only.

The piston 7 can move in the cylinder 6 through a relatively long stroke $S_{max}$ between an extreme rear-end position pulled almost out of the rear end of the cylinder 6 and an extreme front-end position pushed almost out of the front end of the cylinder 6. The length of this stroke $S_{max}$ is, however, quite a bit longer than that actually needed to form the desired dose. Thus the piston 7 is moved only through a shorter stroke $S_1$ or $S_2$, which strokes are in fact respectively bounded by the front-end and rear-end positions, but which otherwise stop at intermediate positions.

As is standard the piston 7 is reciprocated back and forth synchronously a the valve element 5 is moved between its positions. On the back stroke as seen in FIGS. 2 and 3 the valve element 5 permits the piston 7 to draw a dose of the liquid into the compartment 11 through the bypass compartment 4 and past the valve body 5. On the forward stroke as seen in FIGS. 4 and 5 the valve 5 is moved to block flow through the bypass compartment 4 but to uncover the outlet 3 so that the charge in the compartment 11 is expelled through the outlet.

According to this invention the actuator 9 varies the length of the back stroke of the piston 7. This can be done periodically, for instance every third or fifth cycle, or with each actuation. Thus for a certain number of cycles the back stroke is longer than the front stroke until the piston 7 reaches the extreme rear end position at the end of its back stroke, then the back stroke is made shorter than the front stroke until the piston reaches the front end position at the end of its forward stroke. Then the cycle is repeated.

It is also possible as seen in FIG. 6 for the actuators 9 and 16 to retract the piston 7 and valve element 5 back so they stand clear of the walls of the respective chambers 4 and 6. In this position a cleaning fluid is introduces via ports 13, 14, and 15 into the housing 1 to clean it thoroughly.

We claim:

1. A method of operating an apparatus for dosing a liquid, the apparatus comprising:
   a housing having
      an inlet connected to a supply of the liquid,
      an outlet,
      a filling chamber, and
      a bypass chamber having an outlet side from which the outlet opens and an inlet side connected to the inlet;
   a pumping piston subdividing the filling chamber into an inlet compartment into which the inlet opens and an outlet compartment;
   a valve element in the housing movable between a filling position blocking the outlet and connecting the inlet through the bypass chamber with the outlet compartment and a feed position exposing the outlet and blocking flow between the inlet and the outlet compartment through the bypass chamber, the method comprising the steps of:
      alternately retracting the piston through a back stroke while the element is in the filling position to draw liquid into the outlet compartment from the inlet through the bypass chamber and
      advancing the piston through a predetermined advance stroke while the element is in the feed position to eject the drawn-in liquid from the outlet; and
   at least periodically changing the length of the back stroke while maintaining the advance stroke always of the same length.

2. The dosing method defined in claim 1 wherein the length of the back stroke is changed at regular intervals.

3. The dosing method defined in claim 1 wherein the length of the back stroke is changed in steps.

4. The dosing method defined in claim 1 wherein the length of the back stroke is changed steplessly.

5. An apparatus for dosing a liquid, the apparatus comprising:
   a housing having
      an inlet connected to a supply of the liquid,
      an outlet,
      a filling chamber, and
      a bypass chamber having an outlet side from which the outlet opens and an inlet side connected to the inlet;
   a pumping piston subdividing the filling chamber into an inlet compartment into which the inlet opens and an outlet compartment;
   a valve element in the housing movable between a filling position blocking the outlet and connecting the inlet through the bypass chamber with the outlet compartment and a feed position exposing the outlet and blocking flow between the inlet and the outlet compartment through the bypass chamber;
   a pump actuator connected to the piston for displacing same in the filling chamber;
   a valve actuator connected to the valve element for displacing same between its positions; and
   control means connected to the actuators for alternately
      retracting the piston through a back stroke while the element is in the filling position to draw liquid into the outlet compartment from the inlet through the bypass chamber and
      advancing the piston through a predetermined advance stroke while the element is in the feed position to eject the drawn-in liquid from the outlet, and for
   at least periodically changing the length of the back stroke while maintaining the advance stroke always of the same length.

6. The dosing apparatus defined in claim 5 wherein the pump actuator is a time-controlled electric motor.

* * * * *